United States Patent
Iwinski et al.

Patent Number: 6,126,882
Date of Patent: *Oct. 3, 2000

[54] METHOD OF MOLDING A SOCKET TOOL

[75] Inventors: Dean J. Iwinski, Muskego; Marco E. DeVecchis, Racine; Gregory A. Zurbuchen, Kenosha, all of Wis.; George Ulics, Gladwin, Mich.

[73] Assignee: Snap-on Technologies, Inc., Lincolnshire, Ill.

[ * ] Notice: This patent is subject to a terminal disclaimer.

[21] Appl. No.: 09/329,483

[22] Filed: Jun. 10, 1999

Related U.S. Application Data

[62] Division of application No. 08/698,782, Aug. 16, 1996, Pat. No. 5,970,826.

[51] Int. Cl.[7] .......................... B29C 39/10; B29C 45/14
[52] U.S. Cl. ..................... 264/261; 264/263; 264/276; 264/277; 425/129.1
[58] Field of Search .................... 264/261, 263, 264/276, 277; 425/129.1; 81/121.1, 124.6, 125, 900

[56] References Cited

U.S. PATENT DOCUMENTS

| | | |
|---|---|---|
| 1,179,341 | 4/1916 | Spirikowicz . |
| 2,620,001 | 12/1952 | Fratz et al. . |
| 2,720,799 | 10/1955 | Pfost . |
| 2,788,690 | 4/1957 | Able . |
| 2,898,793 | 8/1959 | Fedeson . |
| 2,909,954 | 10/1959 | Rhoads . |
| 4,059,031 | 11/1977 | Magarian . |
| 4,096,896 | 6/1978 | Engel . |
| 4,805,933 | 2/1989 | Swisher . |
| 4,947,713 | 8/1990 | Arnold . |
| 5,062,328 | 11/1991 | Demurger . |
| 5,105,648 | 4/1992 | Steiner et al. . |
| 5,172,614 | 12/1992 | Monnet et al. . |
| 5,259,277 | 11/1993 | Zurbuchen . |
| 5,271,300 | 12/1993 | Zurbuchen et al. . |
| 5,394,773 | 3/1995 | Zurbuchen et al. . |

FOREIGN PATENT DOCUMENTS

| | | |
|---|---|---|
| 565919 | 10/1993 | European Pat. Off. . |
| 2240083 | 7/1975 | France . |
| 9202275 | 7/1993 | Germany . |
| 1251419 | 10/1971 | United Kingdom . |
| 2018179 | 10/1979 | United Kingdom . |

*Primary Examiner*—Jill L. Heitbrink
*Assistant Examiner*—Edmund H. Lee
*Attorney, Agent, or Firm*—Seyfarth Shaw

[57] ABSTRACT

A socket tool is formed primarily from non-metallic composite material. The socket tool body is compression molded of high-strength, glass-reinforced vinyl ester sheet molding compound. Metal inserts are respectively received in the driven and driving ends of the tool body, the inserts respectively defining openings for respectively mateably receiving associated driving and driven members, the inserts being disposed in the body so that no portion of the inserts projects outwardly beyond the exterior surface of the body. The inserts are preferably insert molded in the body, but may also be fixedly secured in pre-existing recesses in the ends of the body, as by press-fitting or bonding. In the latter case, the inserts are provided with anti-rotation outer surfaces which are non-circular in transverse cross-sectional shape.

6 Claims, 2 Drawing Sheets

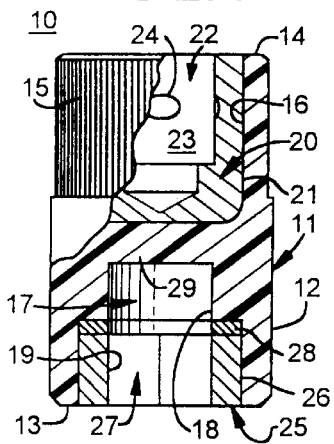
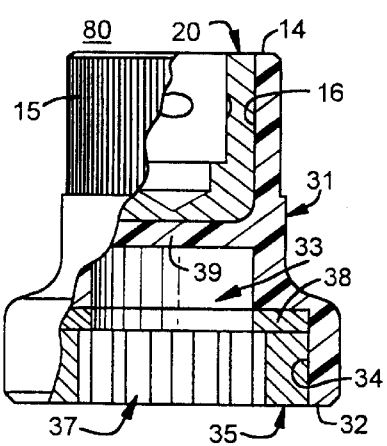
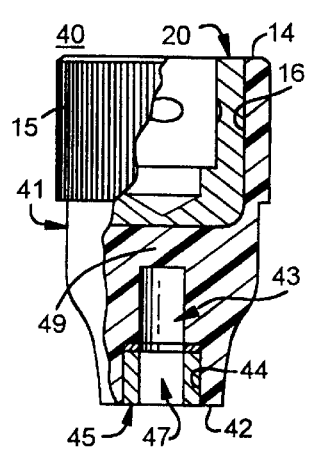
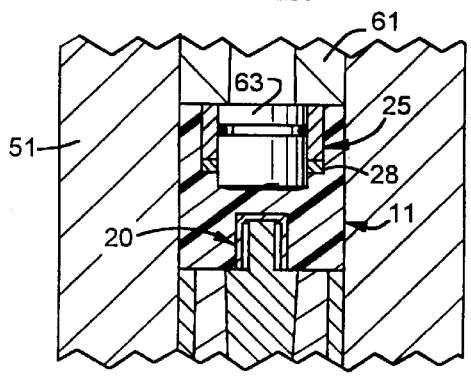
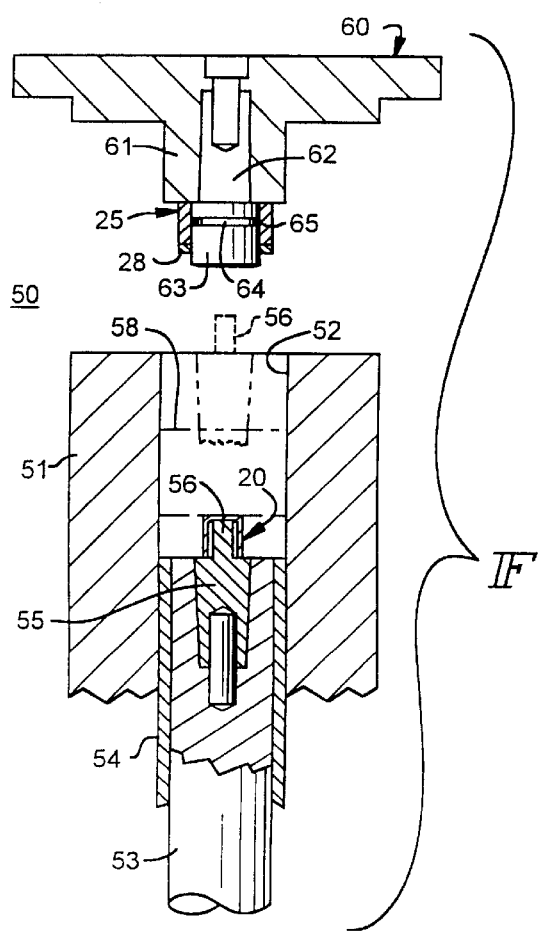
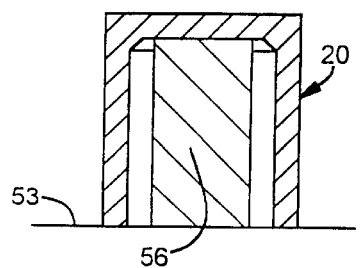

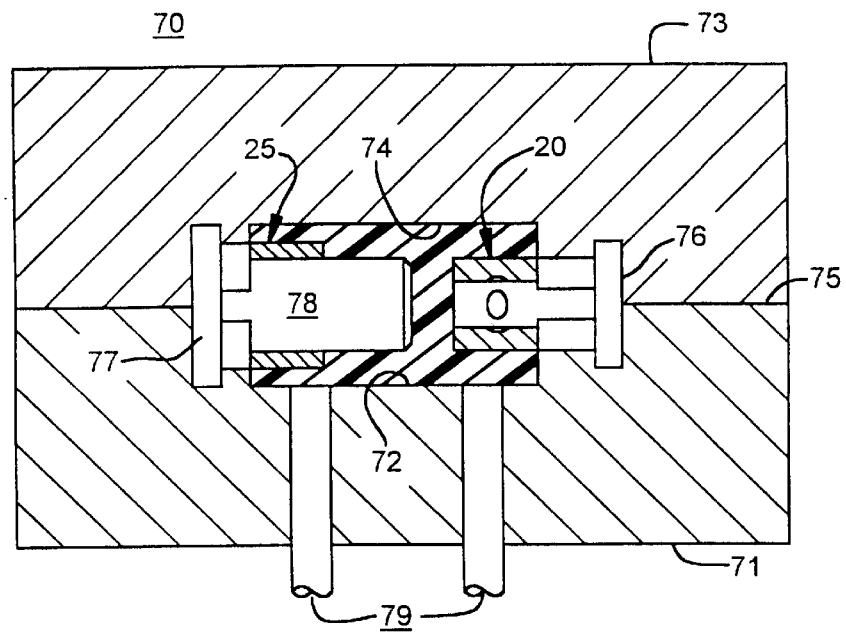
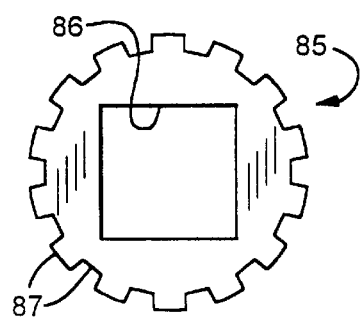
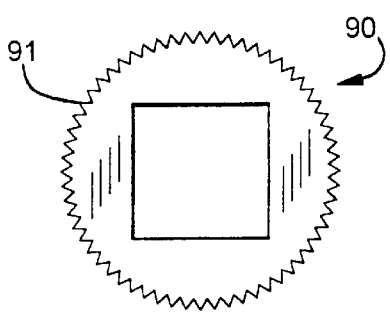

METHOD OF MOLDING A SOCKET TOOL

This is a divisional of application Ser. No. 08/698,782, filed Aug. 16, 1996 now U.S. Pat. No. 5,970,826.

BACKGROUND OF THE INVENTION

1. Field of the Invention

The invention relates generally to socket tools of the type used for socket wrenches and the like and, more particularly, to socket tools of the type which are designed for use in environments which are corrosive or present a spark or shock hazard.

2. Description of the Prior Art

Conventionally, socket tools, such as for socket wrenches and the like, have been made of a suitable metal, such as iron or steel, to afford the necessary strength and durability. Such metal socket tools are manufactured using machining and/or casting or forging techniques. An important disadvantage of metal socket tools is their cost, from both manufacturing and material standpoints. Moreover, metal tools are unsuitable for use in many applications, particularly when a shock or spark condition exists, or when the exterior of the tool is exposed to highly corrosive or magnetic environments. Furthermore, metallic socket tools can tend to mar associated structures with which they come in contact in use.

Insulated socket tools have been provided which afford an insulating covering on the outside of the metal socket tool, which covering may be formed of a suitable plastic or other electrically insulating material. This insulating coating or layer can be easily damaged or may be deteriorated to a point when the insulating and non-sparking properties of the tool are severely compromised and pose a threat to the safety of the user. Also, the insulated tools may still not be suitable for use in certain magnetic environments.

The present invention is an improvement of the socket tool disclosed in copending U.S. application Ser. No. 462,804, filed Jun. 5, 1995, and entitled "composite Socket Tool." That socket tool has a tool body which is formed of a glass fiber-reinforced composite plastic material which is non-metallic and, therefore, non-magnetic, non-conductive and non-sparking, and is also lighter in weight and cheaper than a comparably-sized metal socket tool, while being corrosion resistant and non-marring. In order to better bear the high contact stresses of the drive stud of an associated driver tool, the driven or input end of the socket tool is provided with a metal square drive insert which is insert-molded in the socket tool body. It has been found in use that, in certain applications, the output or driving end of the socket tool is also subjected to high contact stresses with associated fasteners and the like, which may unduly strain or deform the driving end of the socket tool.

SUMMARY OF THE INVENTION

It is a general object of the invention to provide an improved insulating socket tool made of a composite material and which is, at the same time, resistant to high impact stresses at the driving and driven ends of the tool.

An important feature of the invention is the provision of a socket tool having a composite, non-metallic socket body, which is provided with high-strength metallic inserts at the driving and driven ends of the tool for contact, respectively, with associated driven and driving elements.

These and other features of the invention are attained by providing a socket tool for use with associated driving and driven elements, the tool comprising: a non-metallic elongated body formed of glass fiber-reinforced composite plastic material having an exterior surface and having a driven end and a driving end, a first metal insert disposed in the driven end and defining a first opening for releasably mateably receiving the associated driving element, and a second metal insert disposed in the driving end of the body and electrically isolated from the first insert and defining a second opening for releasably mateably receiving the associated driven element, the inserts being recessed in the ends so that no portion of the inserts projects outwardly beyond the exterior surface of the non-metallic body.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view in partial section of a socket tool constructed in accordance with and embodying the features of the present invention;

FIG. 2 is a view similar to FIG. 1 of another embodiment of socket tool in accordance with the present invention;

FIG. 3 is a view similar to FIG. 1 of still another socket tool in accordance with the present invention;

FIG. 4 is a fragmentary, sectional and partially diagrammatic view of a compression molding apparatus for forming a socket tool in accordance with the present invention, the apparatus being shown open;

FIG. 5 is a fragmentary view similar to FIG. 4, with the molding apparatus thereof shown closed to form a socket tool;

FIG. 6 is an enlarged, sectional view of the square insert in the mold of FIG. 5;

FIG. 7 is a simplified sectional view of an injection molding apparatus for forming a socket tool in accordance with the present invention;

FIG. 8 is an enlarged, bottom plan view of an alternative form of insert for use in forming the socket tool of the present invention;

FIG. 9 is a view similar to FIG. 8 of another form of insert; and

FIG. 10 is a view similar to FIG. 8 of yet another form of insert.

DESCRIPTION OF THE PREFERRED EMBODIMENTS

Referring to FIG. 1, there is illustrated a socket tool, generally designated by the numeral 10, constructed in accordance with and embodying features of the present invention. The socket tool 10 has an elongated, generally cylindrical body 11 formed of a non-metallic composite material. The body 11 is preferably molded to shape of a high-strength, glass fiber-reinforced molding compound, which could be either an injection molding compound or a sheet molding compound for compression molding of the type disclosed in the aforementioned U.S. application Ser. No. 462,804. The body 11 has a substantially cylindrical exterior surface 12 and terminates at an output or driving end 13 and an input or driven end 14, the exterior surface 12 preferably being provided with suitable knurling 15 adjacent to the driven end 14. Disposed axially in the driven end 14 is a generally cylindrical cavity 16. Disposed axially in the driving end 13 is a generally cylindrical cavity 17 which has an inner portion 18 and an enlarged-diameter outer portion 19.

Disposed in the cavity 16 is a generally cup-shaped metal insert 20 which has a cylindrical peripheral outer surface 21. The insert 20 defines an opening 22 therein which defines an opening 22 which is preferably substantially square in transverse cross section, having four flat sides 23, each of which is preferably provided with an arcuate detent recess 24 formed therein substantially centrally thereof. The opening 22 is adapted for mating engagement with a comparably-sized driving element (not shown) in a known manner. Preferably, the insert 20 is dimensioned and positioned in the cavity 16 so that no portion thereof projects axially outwardly beyond the driven end 14 of the body 11.

There is similarly disposed in the outer portion 19 of the cavity 17, a generally annular metal driving insert 25, which has a substantially cylindrical peripheral outer surface 26. The insert 25 has formed axially therethrough an opening 27, which is preferably hexagonal in transverse cross section, and is dimensioned for mateably engaging a comparably-sized associated driven element (not shown) in a known manner. While the shape of the opening 27 is illustrated as being hexagonal, it will be appreciated that other shapes could be used for mateable engagement with known driven element configurations, such as square, double-hexagonal and the like. Preferably, the insert 25 is dimensioned and positioned in the outer portion 19 of the cavity 17 so that no portion thereof extends axially outwardly beyond the driving end 13 of the body 11. The particular socket tool 10 illustrated in FIG. 1 is formed by insert molding, as will be explained more fully below and, in this case, there is disposed in the outer portion 19, axially inwardly of the insert 25, a washer 28 for a purpose to be explained more fully below.

As can be seen in FIG. 1, the body cavities 16 and 17 are spaced axially from each other by a transverse web 29 of the composite body material, so that the inserts 20 and 25 and the associated elements engageable therewith are electrically insulated from each other.

Referring now also, to FIG. 2, there is illustrated a socket tool 30 which is similar to the socket tool 10 of FIG. 1 and, accordingly, like parts have the same reference numerals. The socket tool 30 has an elongated, substantially cylindrical body 31 formed of the same composite material as the body 11. However, in the case of the socket tool 30, the body 31 has a driving end 32 which has an enlarged diameter and has disposed therein a comparably enlarged cavity 33 which has a further enlarged-diameter outer portion 34. Disposed in the outer portion 34 is a metal insert 35 which is generally annular in shape and as an axial opening 37 formed therethrough which, in this case, is of 12-point or double-hexagonal configuration for mateable engagement with appropriately sized and shaped driven elements. Seated in the outer portion 34 of the cavity 30 axially inwardly of the insert 35 is a washer 38, since the socket tool 30, as illustrated, is formed by insert molding. Again, the body 31 has a transverse web 39 of composite material which separates the inserts 20 and 35.

In FIG. 3, there is illustrated another embodiment of socket tool, generally designated by the numeral 40, which is again similar to the socket tool 10 of FIG. 1, so that like parts bear the same reference numerals. The socket tool 40 has an elongated, substantially cylindrical composite body 41 which, in this case, has a reduced-diameter driving end 42, in which is disposed a generally cylindrical cavity 43 having an outer portion 44. Disposed in the outer portion 44 is a metal insert 45 which has an axial opening 47 therethrough which, in this case, is square in transverse cross section and is adapted for mateable engagement with a comparably-shaped and sized driven element (not shown) in a known manner. Again, since the socket tool 40, as illustrated, is formed by insert molding, there is disposed in the cavity outer portion 44, axially inwardly of the insert 45, a suitable washer 48. The inserts 20 and 45 are spaced apart by web 49 of the composite material.

As was indicated above, each of the socket tools 10, 30 and 40 is preferably formed by insert molding. Referring now also to FIGS. 4–6, the molding of the socket tools can be effected in a compression mold apparatus 50, which includes a base 51 and a RAM 60. The base 51 defines therein a substantially cylindrical mold cavity 52, the inner end of which is closed by a fixed insert bar 53, which may be surrounded with an axially reciprocating ejecting sleeve 54 for facilitating removal of the finished socket tool from the cavity 52, in a known manner. The insert bar 53 carries an insert holder 55, which includes a pin 56 which projects axially upwardly above the upper end of the insert bar 53 and into the cavity 52. Preferably, the insert holder 55 is axially, reciprocatively movable by suitable mechanism (not shown) between a retracted molding position illustrated in solid line in FIG. 4, and an extended, insert-mounting position, illustrated in broken line in FIG. 4.

In use, when it is desired to mold a socket tool, the insert holder 55 is moved to its extended position and the input end insert 20 is positioned on the pin 56, with the open end down. Referring in particular to FIG. 6, it will be appreciated that the pin 56 is dimensioned and shaped so as to have the same axial and lateral extent as the opening 22 defined by the insert 20, so as to non-rotatably hold the insert 20 in place. The insert holder 55 is then retracted to the solid line position illustrated in FIG. 4 and a mold charge 58 of composite material is seated in the mold cavity 52 above the insert 20. In this regard, the mold charge 58 is preferably composite sheet material, as described above, which may be rolled up in a spiral roll of appropriate size and dropped into the mold cavity 52.

The RAM 60 defines the male portion of the mold apparatus 50 and has a cylindrical turret 61 shaped and dimensioned to be received in close-fitting relationship into the cavity 52. Mounted coaxially in the turret 61 is a pin 62, which has an insert-holding portion 63 which projects axially beyond the distal end of the turret 61 and is preferably provided with a circumferential groove 64, in which is seated an O-ring 65. The insert holding portion 63 is dimensioned to receive telescopically thereover the output insert, which is frictionally retained in place by the O-ring 65. Because the opening 27 defined through the insert 25 is polygonal in shape, whereas the outer surface of the insert holding portion 63 of the pin 62 is circularly cylindrical in shape, the washer 28 is fitted on the insert holding portion 63 outboard of the insert 25 in closely-fitting mating engagement with the insert holding portion 63 to prevent the composite mold charge material from flowing up inside the insert 25 during the molding operation. For purposes of illustration the insert 25 and the washer 28 are shown, but it will be appreciated that the same principles apply for the inserts 35 and 45 and the washers 38 and 48.

When the parts have been thus assembled, as illustrated in FIG. 4, the mold is closed to the position illustrated in FIG. 5, the RAM 60 being driven down into the mold cavity 52 for applying suitable pressure, preferably simultaneously with the application of suitable heat, thereby causing the mold charge 58 to flow around the inserts 20 and 25 to fill the mold cavity 52 and form the finished socket tool, in a known manner. Mold charge material cannot enter the cup-shaped insert 20 because its inner end is closed. When the molding operation is completed, the mold apparatus 50 is opened and the finished socket tool is ejected, all in a known manner. It can be seen that the washer 28 is molded into the finished socket tool and remains a permanent part thereof. In this regard, the washer 28 may be formed of any suitable material, such as a suitable plastic or a relatively soft metal, such as brass.

The socket tools 10, 30 and 40 could also be formed by injection molding. In this regard, referring to FIG. 7, there is illustrated an injection mold apparatus 70, which includes a lower platen or base 71 defining a mold cavity 72 therein, and an upper platen 73 defining a mold cavity 74 therein. The platens 71 and 73 are designed to come together at a parting line 75 so that the mold cavities 72 and 74 cooperate to define the shape of the socket tool to be formed, in a known manner. More specifically, the mold apparatus 70 is provided with an insert holder 76 on which the insert 20 is supported, and an insert holder 77 having a pin 78 on which the insert 25 is supported. It will be appreciated that, when the mold is closed to the configuration illustrated in FIG. 7, the liquid mold charge material is injected into the mold through suitable runners and gates (not shown) in a known manner to fill the cavity around the inserts 20 and 25 and the pin 78 to form the socket tool. In this regard, the mold charge compound is typically a glass-fiber-reinforced nylon material. For purposes of illustration, the mold apparatus 70 illustrated is designed for forming the socket tool 10, but it will be appreciated that the same principles are applied for forming the socket tools 30 and 40, the only difference being in the shapes and sizes of the mold cavities and insert holders. When the molding operation is completed, the mold is opened and the finished part is ejected with the assistance of ejector pins 79, all in a well-known manner.

While the above-described insert molding operations are the preferred methods for forming the insert tools 10, 30 and 40 of the present invention, it will be appreciated that they could also be formed by other techniques. For example, the composite body 11, 31 or 41 could be separately molded to net shape, resulting in a body having empty cavities 16, 17, 33 and 43. The inserts 20, 25, 35 or 45 could then be fixedly secured in the cavities of the composite body, as by press-fitting or suitable bonding. It will be appreciated that where insert molding is not used to mount the inserts, the washer 28, 38 or 48 is unnecessary.

In the case of a press-fitted assembly, the inserts are preferably suitably formed with a non-circularly cylindrical outer surface to facilitate non-rotational mounting of the inserts in the composite body. Referring in particular to FIGS. 8–10, there are illustrated three typical examples of metal inserts designed for press-fitted assembly with the composite body. In FIG. 8 there is illustrated an insert 80, which may be an output or driving end insert, having a hexagonal outer surface 81 and a hexagonal opening 82 formed axially therethrough. In FIG. 9 there is illustrated an insert 85, which may be an input or driven end insert, having a square opening 86 extending axially therethrough and having a gear tooth shaped outer surface 87. FIG. 10 shows on insert 90, which is similar to the insert 85, except that it has a straight knurled outer surface 91. It will be appreciated that various other types of serrated, knurled or otherwise non-circularly cylindrical outer surfaces could be provided for press-fitted inserts.

From the foregoing, it can be seen that there has been provided an improved socket tool and method of forming same, which have all of the advantages of the socket tool disclosed in the aforementioned copending application Ser. No. 462,804, and which additionally provides the benefit of wear-resistant metal inserts at both ends of the tool.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A method of molding a socket tool for use with associated driving and driven elements in a mold apparatus including first and second mold members cooperating to define a mold cavity, whereby the socket tool is a non-metallic elongated body formed of glass fiber reinforced composite plastic material having an exterior surface and having a driven end and a driving end, said method comprising the steps of:

disposing a first metal insert in the mold cavity, disposing a second metal insert in the mold cavity, and introducing into the mold cavity a charge of glass fiber-reinforced composite plastic material and molding the charge such that the charge flows around the inserts to form the socket tool, whereby the first metal insert is fixed in the driven end and defines a first opening having an axis of rotation for releasably mateably receiving the associated driving element, the second metal insert is fixed in the driving end of the body and electrically isolated from the first insert and defines a second opening substantially coaxial with the first opening for releasably mateably receiving the associated driven element, and a third insert fixed in the body inboard of the second insert, and further whereby the inserts being recessed in the body so that no portion of the inserts projects outwardly beyond the exterior surface of the body.

2. The method of claim 1, wherein said inserts are of different lateral cross-sectional size.

3. The method of claim 1, wherein said first insert is substantially cup-shaped, having an open end disposed against an insert holder of the mold apparatus.

4. The method of claim 1, wherein the molding is accomplished by compression molding.

5. The method of claim 1, wherein the mold is accomplished by injection molding.

6. A method of molding a socket tool for use with associated driving and driven elements in a mold apparatus including first and second mold members cooperating to define a mold cavity having opposite ends, the method comprising:

disposing two metal inserts in the mold cavity respectively adjacent to the opposite ends thereof and spaced from each other, one of the inserts having an opening therethrough of non-circular transverse cross section and being supported in the mold cavity on a circularly cylindrical fixture received through the opening;

disposing an annular washer around the fixture and against an inner end of the one insert in close-fitting mating engagement with the fixture and the inner end of the one insert; and introducing into the mold cavity a charge of plastic material and molding the charge so that the charge of plastic material flows around the insets to form the socket tool containing the inserts and the washer, the washer preventing the charge of plastic material from entering the opening in the one insert during the molding step.

\* \* \* \* \*

UNITED STATES PATENT AND TRADEMARK OFFICE
CERTIFICATE OF CORRECTION

PATENT NO : 6,126,882

DATED : Oct. 3, 2000

INVENTOR(S) : Dean J. Iwinski et al.

It is certified that error(s) appear in the above-identified patent and that said Letters Patent are hereby corrected as shown below:

In References Cited, replace U.S. patent number "4,059,03" with --4,058,031--.

Signed and Sealed this

Eighth Day of May, 2001

Attest:

NICHOLAS P. GODICI

Attesting Officer     Acting Director of the United States Patent and Trademark Office